US 8,467,955 B2

(12) United States Patent
Jiang et al.

(10) Patent No.: US 8,467,955 B2
(45) Date of Patent: Jun. 18, 2013

(54) MAP-CENTRIC SERVICE FOR SOCIAL EVENTS

(75) Inventors: Ning Jiang, Sammamish, WA (US);
Fabrice Frachon, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 11/980,882

(22) Filed: Oct. 31, 2007

(65) Prior Publication Data
US 2009/0112467 A1    Apr. 30, 2009

(51) Int. Cl.
*G01C 21/00* (2006.01)

(52) U.S. Cl.
USPC ........... 701/408; 701/409; 701/412; 701/418; 701/419; 701/420; 701/422; 701/425; 701/428; 701/462; 340/995.14; 340/995.19; 340/988; 340/989; 455/456.5; 455/13.2; 455/414.1; 455/456.1; 707/999.005; 707/999.102; 707/999.001

(58) Field of Classification Search
USPC ........................................................ 701/211
See application file for complete search history.

(56) References Cited

U.S. PATENT DOCUMENTS

| | | | | |
|---|---|---|---|---|
| 5,790,974 A | * | 8/1998 | Tognazzini | 455/456.5 |
| 6,016,478 A | * | 1/2000 | Zhang et al. | 705/7.19 |
| 6,691,114 B1 | | 2/2004 | Nakamua | |
| 6,909,967 B2 | | 6/2005 | Hirano et al. | |
| 6,920,328 B2 | * | 7/2005 | Wollrab | 455/456.1 |
| 7,340,691 B2 | * | 3/2008 | Bassett et al. | 715/255 |
| 2003/0061211 A1 | | 3/2003 | Shultz et al. | |
| 2003/0200192 A1 | * | 10/2003 | Bell et al. | 707/1 |
| 2005/0027705 A1 | * | 2/2005 | Sadri et al. | 707/5 |
| 2005/0091096 A1 | * | 4/2005 | Coates et al. | 705/8 |
| 2005/0278371 A1 | * | 12/2005 | Funk et al. | 707/102 |
| 2006/0200490 A1 | | 9/2006 | Abbiss | |
| 2006/0241860 A1 | | 10/2006 | Kimchi et al. | |
| 2007/0011150 A1 | | 1/2007 | Frank | |
| 2007/0061074 A1 | | 3/2007 | Safoutin | |
| 2007/0176796 A1 | | 8/2007 | Bliss et al. | |
| 2009/0112467 A1 | * | 4/2009 | Jiang et al. | 701/211 |

OTHER PUBLICATIONS

Google Maps: http://www.google.co.uk/gmm/Whatsnew.html?hl=en-GB About geodata.gov: http: http://gos2.geodata.gov/wps/portal/gos http://thoos._com/blog/2007/02/15/now-display-search-results-in-map-or-list-views/ http://docs.codehaus.org/display/MAP/Step+5+Link+Search+Results+with+the+Map.

* cited by examiner

*Primary Examiner* — Redhwan k Mawari (57) ABSTRACT

A map-centric service for creating, finding, and organizing social events is described. Social events may include gatherings, goods or services for sale or other types of events about which a group of people may wish to share information. The service provides a graphical indication of the location of a plurality of social events superimposed on a map, providing a geographic context to social events. The geographic context may be augmented with text graphical indications or information in other forms, further identifying characteristics of the social event. Information about social events may be made accessible to multiple users through a web service. A user may search for social events by specifying desired characteristics of the social event. The service can also generate an optimal route for user selected events.

20 Claims, 9 Drawing Sheets

MAP-CENTRIC SERVICE FOR SOCIAL EVENTS

BACKGROUND

A growing area of Internet use involves social events in which information provided by users is made available to other users. Examples of social events facilitated by the use of an Internet service include online networking, organizing social gatherings and sharing lists of available goods and professional services available for purchase.

For example, a service facilitating online networking may provide users a mechanism to post information about their hobbies or interests. Social networking services often allow users to share photographs, videos and information of interest to them in any other media. The service may then provide other users tools to search for and meet people who share common interests or to maintain contact with existing friends, family and colleagues.

Other services may help users organize social gatherings. Such gatherings often take the form of a party or a meeting in a public place, which could be a restaurant or arena for a spectator event (such as a sporting event or concert). The service may provide a group of people invited to the gathering with a mechanism to share information, such as the date, time, purpose or geographic location of the gathering. A service operating over the Internet allows users to disseminate information about the gathering, and solicit attendance from those invited to the event.

Other Internet services arrange information about goods and professional services in a fashion that allows interested parties to supply or find information of interest to them. For example, the information may be organized in lists, each relating to a specific type of good or professional service. Users of such social lists can post items for sale or trade, search for items to buy, or search and post professional services available.

Consequently, a wide range of information about social events can be available, whether that information relates to a planned gathering, an item for sale by a user, or a user who would like to meet others with similar interests. Services designed to facilitate sharing of information may make that information available to the entire online community. Though, some services are intended to allow only specific users within a social network to post or access information relating to social events.

SUMMARY OF INVENTION

A service for sharing social event information may present a map-centric view of events. Because information shared by users relating to social events frequently has a geographic relevance, such a map-centric display can enhance a user's ability to use and share information about social events. For example, a gathering may be planned to occur at a particular location and may therefore only be of interest to users who are or could be in the vicinity of that location. Similarly, an item for sale may be available for pick up at a particular location. Information about these and other types of social events may be presented by graphical overlays on a map, allowing the user to readily assimilate the information.

In one aspect, the invention relates to a method of operating a networked device to graphically present social event data on a display associated with the networked device. To create the display, the networked device accesses data relating to social events, including a geographic location associated with the social event. Map data associated with the geographic location of the social events is also accessed. The map data and social event data are rendered graphically on the display, with the social event data overlaid on the map to give a graphical indication of the social event at a position on the map representing the location of the social event.

In some embodiments, through a user interface, the user may specify at least one desired characteristic of a social event and social events having the desired characteristic may be selected for display. The selected portion of the plurality of social events may be displayed via a graphical indicator on the display. For example, the desired characteristic of the event may include the date of the event, or a range of dates for the event.

If data relating to the social event includes a time, a graphical indicator of the event on the map may include a visual characteristic selected based on the time of the social event. Also, a user may specify an icon to be associated with an event.

In another aspect, the invention relates to a computer readable medium comprising computer-executable modules, including a component for receiving user input defining a social event and communicating data related to the social even to a social event service; a component for obtaining data related to a plurality of social events from the social event service; a component for obtaining from a mapping service a map and route between designated locations; and a component for displaying the map. The map may include a graphical indication of each of the plurality of social events and a route between at least two of the plurality of social events. The component for displaying may comprise a web browser, and the component for obtaining the map and the route may comprise a control object plug-in for the web browser.

The computer readable medium may further comprise a component for receiving user input relating to a selected event corresponding to a displayed indicator on the display. Also, the component for displaying may be adapted to display information relating to the selected event in conjunction with the displayed indicator corresponding to the selected event. Further, the component for displaying may be adapted to display a calendar containing an indication of the date of the selected event.

Other components may be included, including a component for designating locations in an order based on scheduled times of events of the plurality of events and providing the designated locations to the component for obtaining from a mapping service a route between designated locations.

In a further aspect, the invention relates to a method of operating a map-centric service for social events. As part of the method, a server may receive from a plurality of users, data relating to a plurality of social events, the data comprising, for each of the plurality of social events, a location. The server may provide data relating to social events of interest in response to a query from the user defining at least one characteristic of the social events of interest. A client device may receive the data relating to the social events of interest from the server and display a map indicating each of the social events of interest at a position on the map corresponding to the location of the social event.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that social networking sites often involve the communication of information with geographic relevance. For example, people, gatherings, goods for sale, professional services or other social events about which information may be provided through a social networking service may only be of interest to people in a certain geographic area. However, geographic information about social events has not previously been presented in a fashion that allows a user to readily recognize the geographic relevance or easily apply it. By displaying information about social events on a map, the geographic relevance may be readily apparent from the geographic area displayed on the map and/or indications of events that may be overlaid on the map.

Any suitable type of social events may be indicated on the map. For example, social gatherings, and the locations of those social gatherings, may be graphically indicated on the map. Alternatively or additionally, goods or services that are available for purchase and the locations at which those goods or services are available may be indicated.

Figure 1:
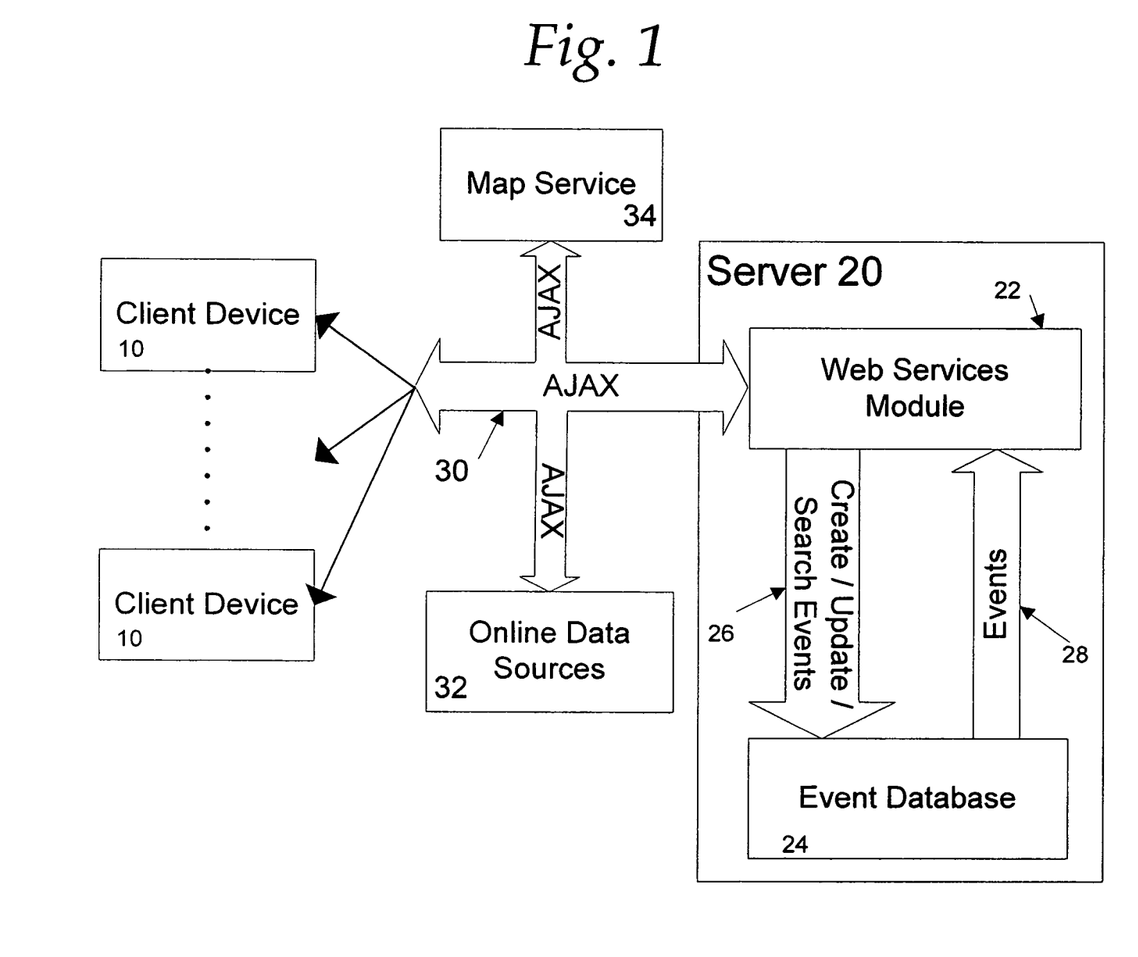
FIG. 1 is a block diagram illustrating a system according to an embodiment of the invention.

FIG. 1 is a block diagram illustrating a system that contains multiple client devices 10, i.e., a networked device, to a server 20 over a network connection 30. Examples of client devices include a computer, laptop, PDA, and a cellular phone. The server 20 provides access to a social event service. The illustrative embodiment shown in FIG. 1 allows for a plurality of client devices 10 to connect to the server 20 over the network connection 30.

In the illustrated embodiment, the network connection 30 is a public network, such as the Internet. In this embodiment, a web browser on a client device 10 may communicate to, and display information provided by, the server 20. Though, any suitable mechanism may be used for display Any suitable mechanism may be used to exchange information between client device 10 and server 20. For example, asynchronous JavaScript and XML (AJAX) may be used to provide a highly interactive user experience for the user of the client device 10.

The server 20 contains a web services module 22 that may send and retrieve information about social events in response to user input. When a client device 10 creates a social event, updates an existing social event, or performs a search for social events, the web services module 22, receives the request via the network connection 30, and updates or queries the event database 24 via the connection 26. Information about an event or events found as part of a search may be returned from the event database 24 via connection 28.

If the client searches for social events having a set of desired characteristics, the event database 24 returns events that meet the specified criteria via connection 28. The web services module 22 also may query online data sources 32. These additional data sources extend the search beyond those available in the event database 24. In some embodiments, the online data sources will be third party sources of event data.

Each client device 10 may include software that presents events information about events by overlaying an indicator representative of the event on a display of a map. Each client device 10 may obtain from any suitable source information defining a map containing the relevant geographic area for display of one or more events. In the embodiment of FIG. 1, information defining the map may be obtained over network 30 from map service 34. Map service 34 may be a known mapping service available over the Internet or any other suitable map service. However, the specific source of map data is not critical to the invention and client devices 10 may be programmed with mapping information or obtain map information in any other suitable way.

Regardless of the source of map data, client device 10 may combine the map data with information about events provided by web services module 22 to present information on events matching a specified user query graphically. The client device 10 then displays the event data for the user overlaid on the map. The event data may comprise one social event or a plurality of social events having the desired characteristic specified by the user.

In the embodiment illustrated, event database 24 may contain information relating to social events. This information may be organized in any suitable fashion. For example, web services module 22 may organize information according to social networks. In such an embodiment, information stored in event database 24 in response to input from a user that is a member of a social network may be available to other users who are also members of that social network but not available to other users who are not members of that social network. Any suitable access control mechanisms may be employed on server 20 to implement social networks. Such access control functionality may make event information available to predefined groups of users or may make information about specific events available to specific users identified in any suitable way.

In an illustrative embodiment, a user operating a client device 10 may create a new social event, update an existing social event, or search for social events via the user interface provided by client device 10. Creating, updating and searching an event require the user to specify at least one desired characteristic of the social event. For example, if the user is interested in searching for a social event that is a party, a desired characteristic the user may specify, for example, may be the date or range of dates the party is to take place, the time of the party, the location of the party, the host of the party, the theme of the party, and/or the guests of the party. However, the event information stored in event database 24 is not limited to information about parties or social gatherings. For example, events stored within event database 24 may indicate goods or professional services available for sale or other types of social events.

Further, the types of information communicated to a user of client devices 10 through a map centric display is not limited to social event information stored in event database 24. Information presented through a display in client device 10 may be derived from any suitable source. For example, one or more online data sources 32 may be accessible to the system of FIG. 1. Such information may be accessed by web services module 22 or may be accessed directly from client device 10. If information in online data sources 32 is accessed from client devices 10, each client device 10 may be configured with software for presenting a user interface allowing the user to specify criteria for accessing information in one or more online data sources 32, retrieving that information and presenting it through a user interface on client device 10.

Online data sources 32 may include any suitable data sources. For example, an online data source 32 may include a database of information about sporting events. Alternatively or additionally, online data sources 32 may include a database about goods or services for sale. Regardless of the specific type of information an online data source 32, the system of FIG. 1 may be configured to search the online data sources 32 in response to user input through client devices 10 to retrieve information about events that may be displayed graphically by overlaying indicators of those events on a map.

Figure 2:
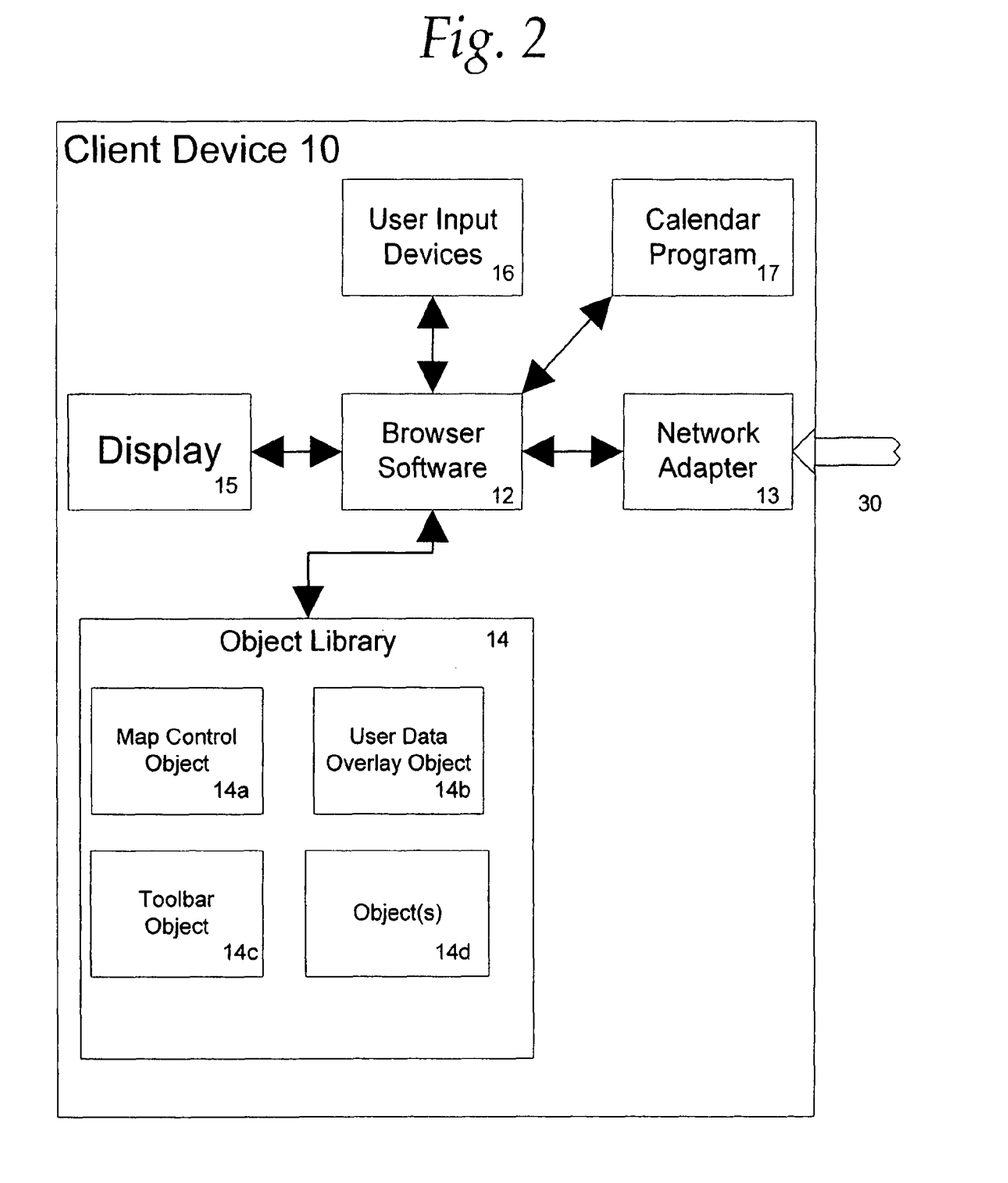
FIG. 2 is a block diagram of a client device of the system of FIG. 1.

The operation of the client device may be further understood in light of the block diagram shown in FIG. 2. Client device 10 may include components as are known in the art. For example, FIG. 2 illustrates that client device 10 may include a network adapter 13, allowing client device 10 to communicate over network 30. Client device 10 may also include display 15, allowing information generated by operation of client device 10 to be graphically presented to a user. Also as illustrated in FIG. 2, client device 10 may include one or more input devices 16. User input devices 16 may include a mouse, keypad or other suitable user input device.

Client device 10 may also be programmed with one or more computer executable components stored in computer-readable medium associated with client device 10. In the embodiment illustrated, client device 10 includes browser software 12. To function as a component of a system that allows a user to specify and retrieve event information, browser software 12 may interact with an object library 14 containing one or more software objects. The objects in object library 14 may be implemented in any suitable way, obtained from any suitable source.

In one embodiment, browser software 12 generates the user interface for the user to create, edit, search and display social events. The browser software 12 transmits and receives data from the network connection 30, by way of the network adapter 13. Browser software 12 may be any suitable browser software. For example, commercially-available browser software 12 may be used. However, the invention is not limited by the type of software used to create, edit, search and display event information, and any suitable software may be used.

When a user specifies criteria for a social event, through user input devices 16, the components of client device 10 will submit a search for social events to the server 20 or other data source. The results of the search may be returned to the client device, in particular to the browser software 12 via the network adapter 13. The results may include social event data including the location at which the social event is to occur. The client device may simultaneously or separately receive map data originating from the map service 34. The information retrieved may be combined to present information graphically through a user interface on display 15. Formatting of user input information to create an appropriate search query and display of search results may be performed by execution of objects within object library 14. The object library 14 provides a description of the necessary objects to the browser software 12. In the illustrated embodiment, the object library is a JavaScript Library and each object in the object library 14 may be plug in for browser software 12. However, the specific implementation of modules within object library 14 and the specific mechanism by which those objects interact with browser software 12 is not critical to the invention in any suitable implementation of the objects in object library 14 may be used.

Object library 14 may contain any suitable number and type of object modules. In the embodiment illustrated, the library comprises a map control overlay object 14a, a user data overlay object 14b, a toolbar object 14c, and any number of additional objects 14d. These library objects are downloaded from server 20 and stored on the client device 10. These control object plug-ins for the web browser are described presently.

In the embodiment illustrated, the map control object 14a provides a mechanism for client device 10 to interface with map service 34 (FIG. 1). For example, map control object 14a may receive as an input an identification of a geographic location and retrieve information defining a map of a geographic region around the specified location. Alternatively or additionally, map control object 14a may receive as an input a designation of two locations. In response to such input, map control object 14a may interface with map service 34 to obtain a description of a route between the designated locations. The specific inputs to map control object 14a are not critical to the invention. The inputs may be defined, for example, by the format of information received by map service 34.

The user data overlay object 14b, provides a graphical indicator of the location of social event search results on the display 15. These graphical indicators are superimposed on the map, providing the user with a visual indication of the location of social events. Each social event is associated with a visual indicator.

The toolbar object 14c provides create, update, and search inputs for the user as a toolbar control on the display 15. The user may enter through the toolbar control feature of the user interface a desired characteristic of the event. Depending on the type of social event (gather, buy/sell goods, apartment search, etc.), the toolbar object 14c will provide different input options on the toolbar control and may formulate search queries to web services module 22, online data sources 32 or other suitable data sources to retrieve information that responds to the user input.

Object library 14 may contain any number of additional objects indicated as objects 14d. These objects 14d may control client device 10 to present a user interface through display 15 that either provides information to a user or receives user input to perform functions associated with the service provided by the system of FIG. 1. For example, objects 14d may present a user interface through which a user may define an event that is to be stored in event database 24 for access by other users. Regardless of the type of information obtained by client device 10, the display 15 may show social event data and provides a graphical indication of the characteristics specified by the user. The display 15 may show a map comprising a graphical indication of each social event, and a route between social events when requested by the user. In the preferred embodiment the information is displayed as web browser.

A user interacts with the browser software 12 by way of user input devices 16 (keyboard, mouse, buttons, etc.). In this way the user specifies social event characteristics, and interacts with the content.

In the embodiment illustrated in FIG. 1, information on events is obtained from event database 24 and online data sources 32. However, it is not necessary that event information be obtained and stored in data sources external to client device 10. A calendar program or other suitable component on client device 10 may store information about events. For example, the user may also specify that events scheduled in a calendar program 17, such as Microsoft Outlook information management, are to be displayed on the map. In the embodiment shown in FIG. 2, the browser software 12 obtains events from the calendar program 17 directly. A user may add a social event to his or her calendar program through the web browser interface. Similarly, in some embodiments, a calendar mode may be supported, whereby a user may view social events the user currently intends to attend, and social events the user currently is considering to attend. Once a social event has been added to the users calendar program, the full functionality of the calendar program may be used, for example, to remind the user of the event at a time close to the event. In another embodiment the calendar program comprises a map mode. A user can switch between a calendar view and map view. The calendar view may list events chronologically, while the map view displays the events by location on a map. This enables a user to easily switch between a temporal view of events and a spatial view of events. Conversely, information about events obtained through browser software 12 may be provided to calendar program 17 for integration with data maintenance by calendar program 17.

Figure 3:
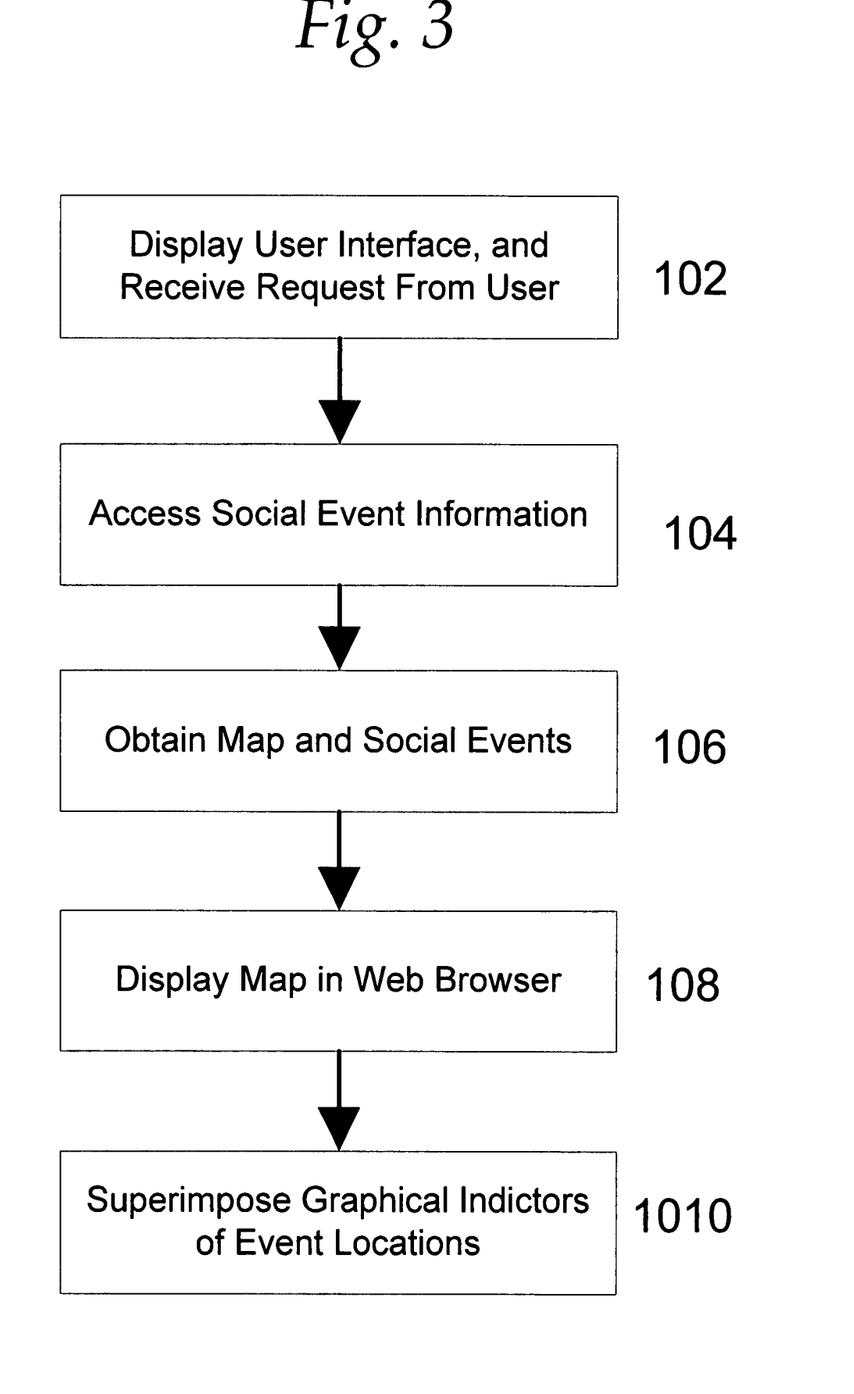
FIG. 3 is a flow chart illustrating the operation of the client device of FIG. 2.
Figure 5:
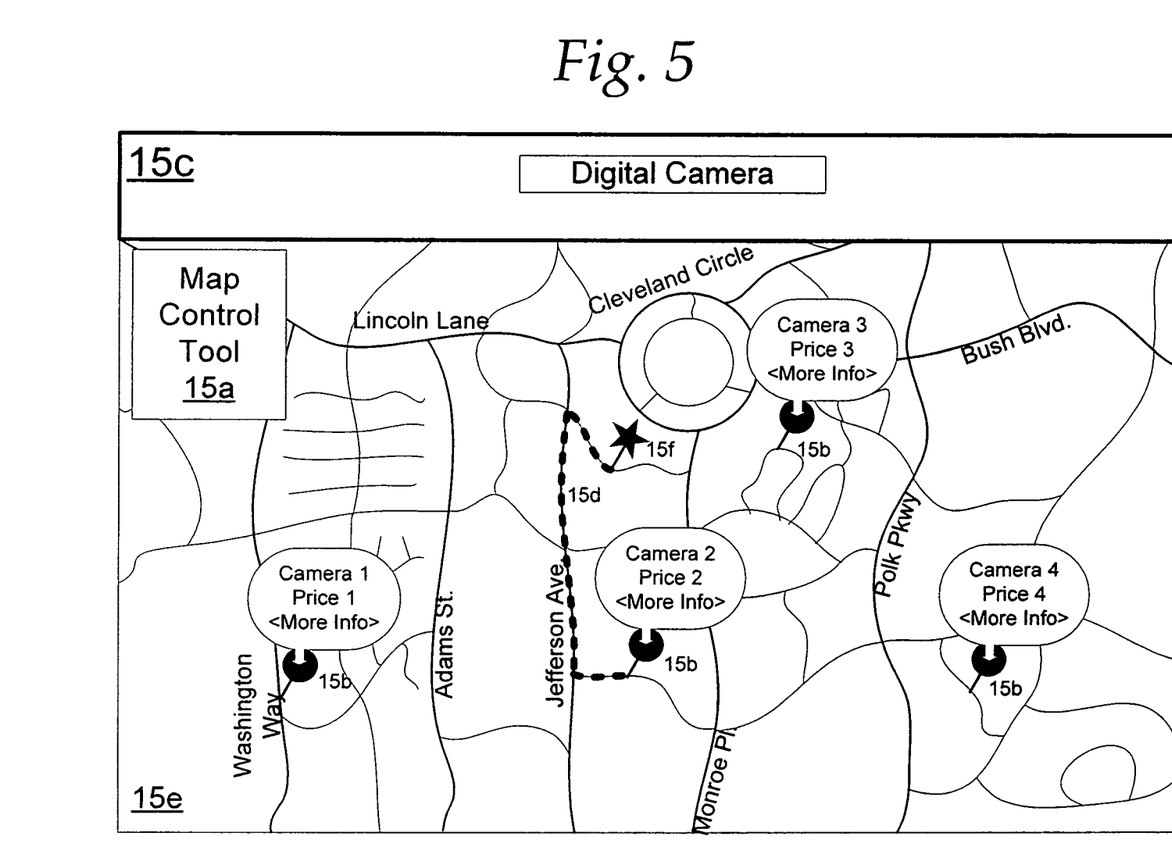
FIG. 5 is an illustration of a user interface displayed on the client device of FIG. 2 after performing a search for a good.

Regardless of the specific components contained within client device 10, the components may interact to allow a user to perform functions related to the scheduling and viewing of social event information. FIG. 3 is a flow chart illustrating the operation of the client device 10 according to embodiments of the invention. In step 102 a user interface is displayed for the user within a web browser. An illustrative view of the user interface is shown in FIG. 5. This user interface features a toolbar control 15c for the user to create social events, edit social events, or search for social events by a desired characteristic. The desired characteristic of the event may include the date of the event, or a range of dates for the event. In some cases a user may specify the type of event, and the time and/or place of the event. In the embodiment illustrated in FIG. 5, a field in toolbar control 15c is shown with an input value of "digital camera," indicating that a user has specified a search criteria seeking information about a digital camera. Such a criterion may be used to search a database of items for sale.

The user may submit a created social event or social event search characteristics via the toolbar control 15c. In step 104, the client device accesses social event information. Any suitable method may be used to access social event information. However, the embodiment illustrated in FIG. 1, information is accessed from a client device 10 by sending a search query to server 20. In such an embodiment, the user input information is transmitted to the server 20, which processes it. In step 106, social events having the desired characteristic and an appropriate map are returned from the server 20. In addition, client device 10 may obtain map information useful for graphically displaying information about the social event or events obtained at step 106. Any suitable mechanism may be used to perform the processing illustrated at step 106. Information defining a map may be provided to a client device 10 by web services module 22 (FIG. 1) either directly or indirectly by sending commands to map service 34. Alternatively, an object with an object library 14 on client device 10 (FIG. 2) may process information defining a social event received from server 20 to extract location information. Such an object may then contact map service 34 (FIG. 1) or other suitable sources of map information to define a map of a geographic region in the vicinity of an event.

In step 108, the map is displayed in the web browser as the map 15e in FIG. 5. Additionally map tools, such as the map control tool 15a, are loaded and displayed in the web browser. Map control tool 15a may, for example, provide a control on display 15 (FIG. 2) through which a user may vary spatial, or other characteristics of map 15e. For example, it is known in the art to display a map with pan and zoom controls. Such controls can be implemented by map control object 14a (FIG. 2). Alternatively or additionally, any other suitable map controls may be displayed in conjunction with event information.

In step 1010, graphical indicators 15b of the social event data are superimposed on map 15e. Graphical indicators 15b may be generated by a user data overlay object 14b (FIG. 2) or in any suitable way. In the embodiment illustrated in FIG. 5, events are indicated graphically by "push pin" symbols on the map. Associated with each push pin symbol may be a "text" balloon or other suitable presentation of textual information. In the embodiment of FIG. 5, the text balloons associated with each graphical indicator appear on the map associated with each graphical indicator. However, other suitable display formats may be used. For example, text information associated with a graphical indicator of an event may be displayed only in response to user interaction. For example, textual information associated with an event may appear when a user uses a user input device 16 (FIG. 2) to position a cursor above the graphical indicator of the event. Though FIG. 5 shows only textual information provided in conjunction with graphical indicators of events, the invention is not so limited. Information may be provided in any suitable form in response to user input. For example, additional information may be provided pictorially or audibly in response to user input.

Other types of information may alternatively or additionally be presented on display on conjunction with a map graphically indicating events. For example, a route 15d may be calculated between two or more locations depending on the nature of the user's query. After step 1010, the user may interact with the map using the map control tool 15a, select social events via their graphical indicators 15b to display more information, perform a new search using the toolbar control 15c, etc. The client device transmits and receives information from the server 20 and map service 34 as necessary to provide additional information about social events, different level of map detail, etc.

Figure 4:
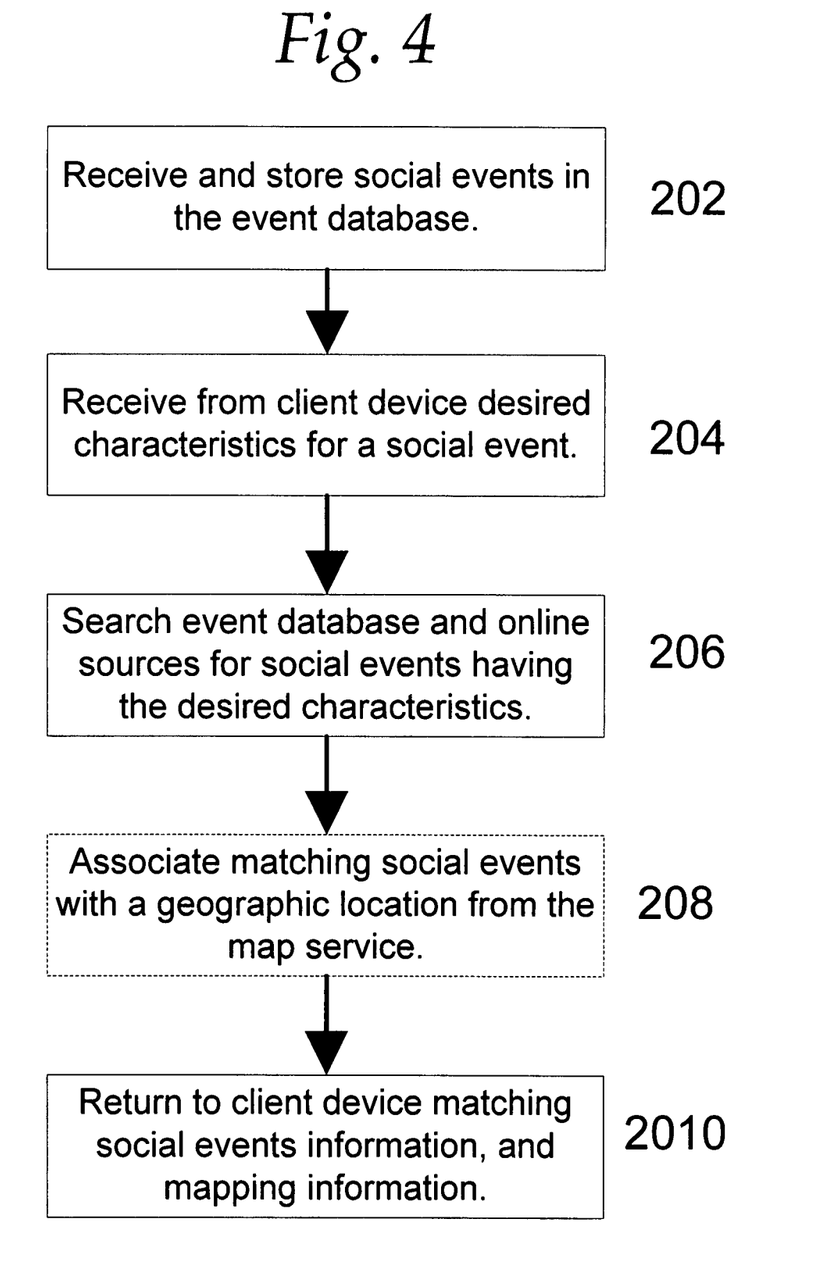
FIG. 4 is a flow chart illustrating the operation of a server in the system of FIG. 1.

The information presented on the display associated with a client device 10 may be obtained from any suitable source. In the system depicted in FIG. 1, information may be obtained from a web service operated on a server 20. FIG. 4 is a flow chart illustrating the operation of the server 20. In step 202, the server receives and stores information about social events including location, in event database 24. These social events may be defined by users of the social networking service and may be uploaded from client devices 10.

However, the information in event database 24 may come from any suitable source, including being generated by the operator of the social networking service, the operator of other web services or other information providers.

In step 204, a request from a client device to search the event database 24 for events having one or more desired characteristics is received. The request may be generated by a client device 10 in response to user input.

The request to search the event database 24 may be in any suitable form. The structured query language may be used to define combinations or characteristics of events to be located.

In step 206, the web services module 22 searches the event database 24 for events having the desired characteristics. In some embodiments, server 20 may interface with external data sources, such as online data sources 32 (FIG. 1) to obtain information from sources other than event database 24. In those embodiments, web services modules 22 (FIG. 1), in response to a search request, may query event database 24 and other data sources, such as online data sources 32. The desired characteristics act as a filter for the plurality of social events. As an example, the desired characteristics may comprise a type of social event, and a time and/or place for the social event. Only events having these characteristics will pass through the filter and are returned to the client device in response to a user request.

The portion of plurality of social events available in the event database 24 and, in the embodiment in which events are obtained from external sources, the online sources 32 having the desired characteristic are accumulated by the web services module 22. Map information associated with the identified events may be obtained in any suitable way. In some embodiments, information to render a map on a user display may be retrieved from a mapping service by action of software on a client device 10. In other embodiments, a web service storing information about events may obtain information used by a client device 10 to render a map. In such embodiments, the process of FIG. 4 may include an optional step 208 in which web service is module 22, or other suitable component on server 20, may access the map information. In step 208, location identifying information associated with the social events is identified and the map service 34 is queried such that the event locations may be associated with a geographic location on a map. In step 2010, the server returns to the client device 10 the social events having the desired characteristics and in embodiments in which map information is obtained by web services module 22 map information.

In the embodiment illustrated, information about social events matching search query is shown transmitted to a client device 10 in a single step. Information may be transmitted in multiple steps or iteratively through a sequence of exchanges between a client device and server 20. In some embodiments, the iterations may be the result of a user of a client device 10 modifying a request for information about events after seeing information obtained in response to an initial query. However, the specific mechanism, including the number and type of interactions between the client device 10 and server 20, is not critical to the invention. For example, server 20 may respond to requests from a client device for additional information about a social event not originally transmitted to the client device, requests for routes between geographic locations, and new queries from the client device.

The process of providing information in response to a query initiated by a user may contain additional or different steps and illustrated in FIG. 4. For example, server 20 may maintain user accounts, such that only users having accounts with the social networking service maintained by server 20 are able to access information in the event database 24 (FIG. 1). In such embodiments, the process of FIG. 4 may include a step of verifying that a request for information is generated by a user with an account. Also in such an embodiment, searching an event database at step 206 may alternatively include selecting only information about events to which a user initiating the query has access. In addition, server 20 may associate user information with a user. User information may be any suitable form and may include the location of the user, the name of the user, other users the user is associated with, saved social events, etc. Storing such information in an account may eliminate the need for the user to provide information each time the user wishes the client device 10 to connect to the server 20. A user account, for example, may be employed to a user selling goods. Such an account may enable the server to only associate the user with the goods for sale, rather than storing personally identifiable information about the user. Also, if a user changes contact information, she need only update the user account information, rather than all items she presently has available for sale. Accordingly, but not expressly shown in FIG. 4, a process of operating a server may include interactions with a user relating to creating and managing accounts. Likewise, a process of operating a server according to embodiments of the invention may include steps providing for types of interactions other than interactions relating to storing and retrieving information about events.

Regardless of the specific interactions between a user, operating through a client device 10 or other suitable device providing a user interface, and server 20 or other suitable source of event information, information about events may be displayed to a user graphically using a map-centric display. FIGS. 5, 6, 7, 8 and 9 illustrate examples of map-centric displays containing event information according to embodiments of the invention.

As an example of the functionality, FIG. 5 illustrates interactions with a user who wishes to search for a digital camera. The results of this example search are shown in FIG. 5, which is an illustration of the user interface on display 15 on client device 10. The display shows a map 15e of the geographic location relevant to the user's search. The map 15e shows street information. In some embodiments of the map 15e, other types of map information may alternatively or additionally be shown. For example, map information may include political boundaries, names of geographic features, etc.

The position, zoom, or other characteristics of the map display may be controlled by the user via a map control tool 15a. The social event search results (digital camera sellers in this example) are illustrated on the map with a graphical indicator 15b. In this example, the graphical indicator includes a pin, and bubble showing information about the good. A toolbar control 15c displays the desired characteristics specified by the user (e.g., "digital camera"), and may also include additional options (not shown) to further limit the search results by specifying additional desired characteristics. A route 15d is shown between the user location 15f (illustrated as a star) and the location of "Camera 2." This route is illustrative, and the display of a route may be user initiated in any suitable way such as through the use of controls (not shown) in the display or commands or control information input through a user interface.

Figure 6:
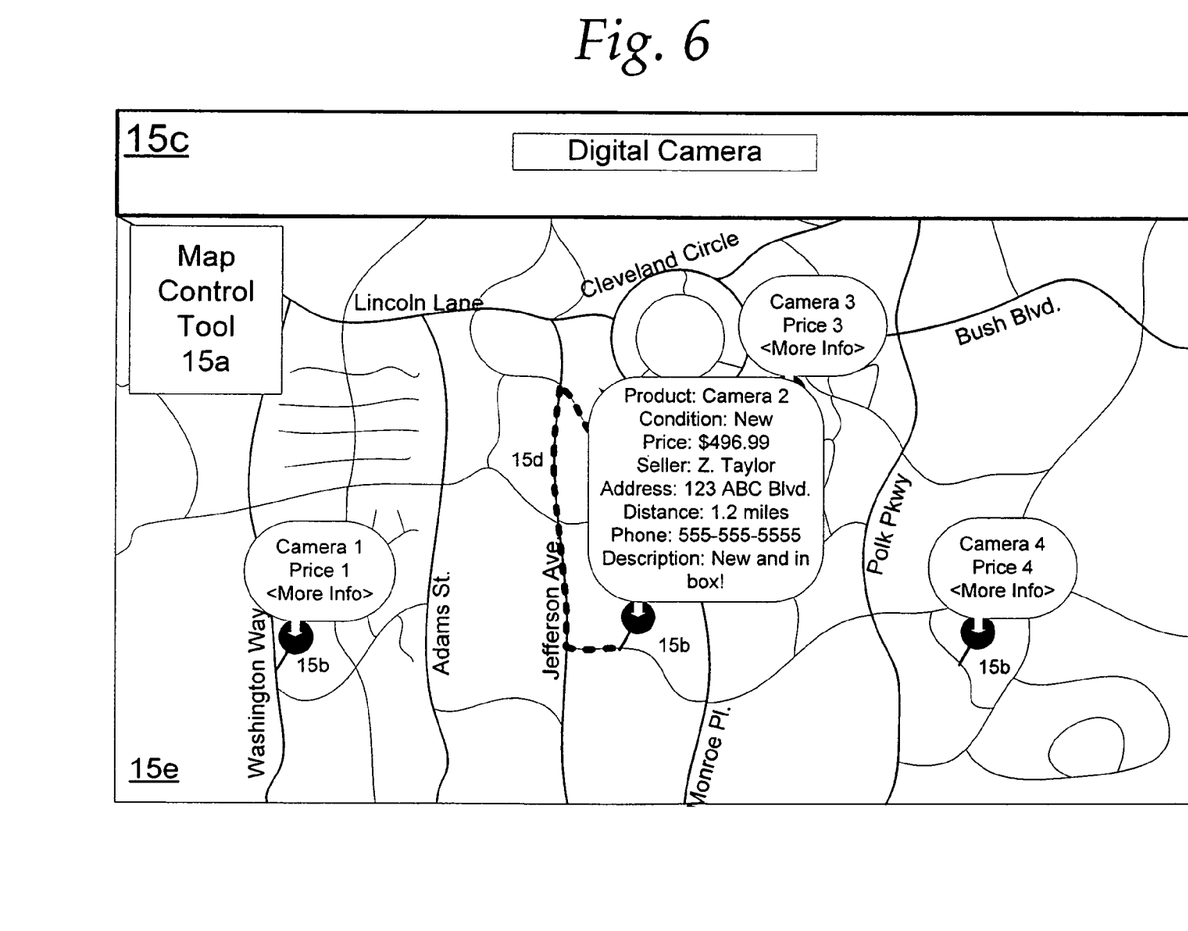
FIG. 6 is an illustration of a user interface displayed on the client device of FIG. 2 after performing a search for a good, and selecting a particular good to display more information.

In this example, the user is interested in learning more about Camera 2. The user selects Camera 2 which causes the web browser to provide additional information about Camera 2 as shown in FIG. 6. A user may select a displayed event using "point and click" interactions as are known in the art or other suitable forms of user interaction with a computing device. In the example of FIG. 6, additional information about a selected event is displayed in a larger text box. For example, the product name, condition, price, seller, sellers address, distance from user, sellers phone, and product description may be provided in any suitable way. However, details available for display may depend on what the seller has provided the type of event selected and/or other factors.

Figure 7:
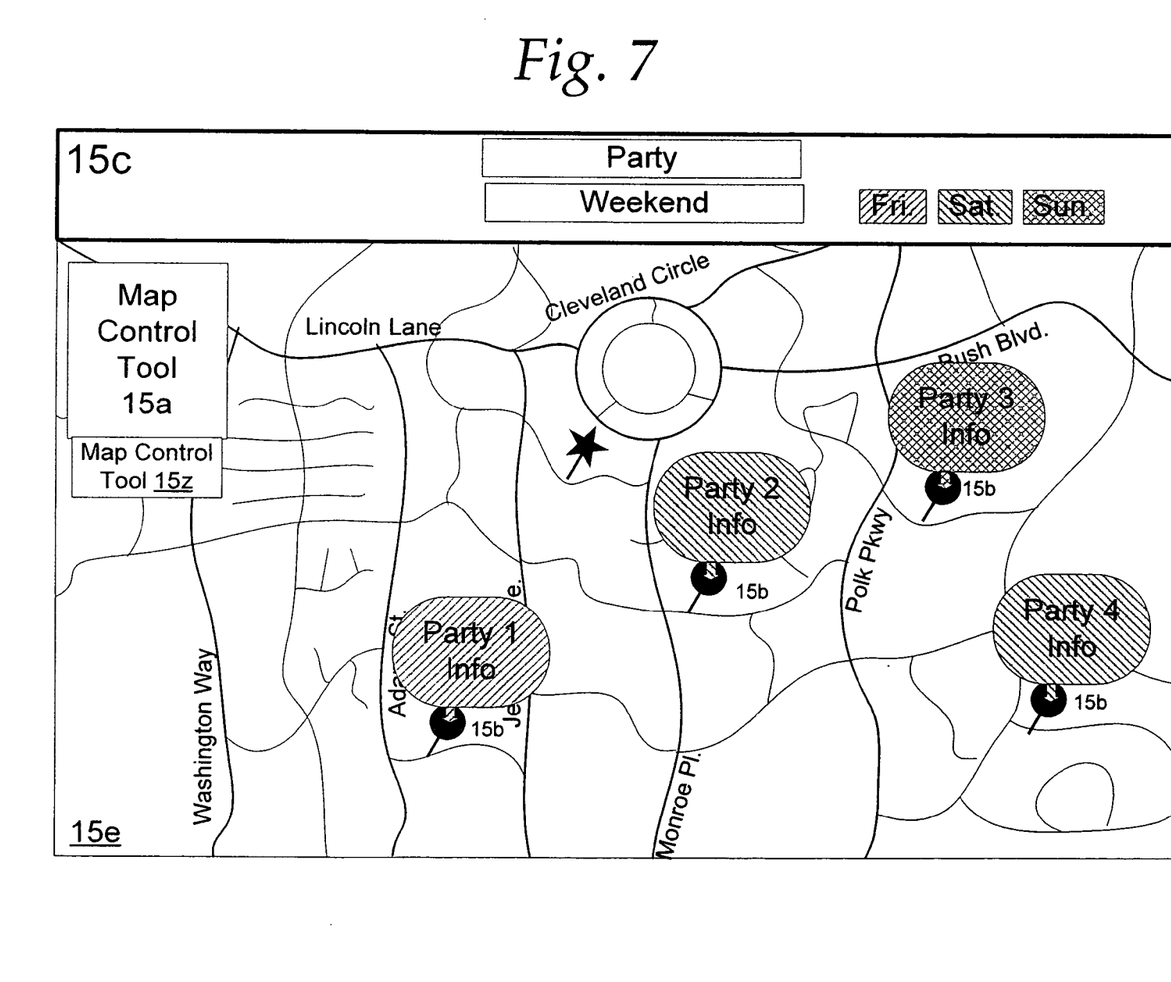
FIG. 7 is an illustration of a user interface displayed on the client device of FIG. 2 after a search for a social event that is a party to occur on the weekend.

FIG. 7 illustrates a further example in which a user is searching for a party to occur on the weekend. The user has entered information about desired events into a toolbar control and the server has returned information relating to a number of parties occurring over the weekend. Each social event having these desired characteristics has at least one location and at least one time/day associated with it.

A graphical indicator 15b is superimposed over the map at the location of each party. Select information about each party is shown near the geographic location.

In order to provide additional information to the user of the client device 10, visual cues may be incorporated into a graphical indication of an event. In this example, a graphical indication of the date of the party may be included. In the example of FIG. 7, each text bubble is presented with a pattern to indicate the date of the party. A key 15g is provided, enabling the user to interpret this information. Alternatively, color may be used in some embodiments to illustrate the date or time of an event, although any visual indicator may be used; for example, an icon.

Information other than the date may be conveyed about a social event in a similar way. Graphical indicators displayed at or near the geographic location of the social event may be used to illustrate the type of event (a soccer ball for a soccer game, a balloon for a party, etc.), an avatar of the host of the event, a picture of the good being sold, etc. These icons may be selected from a database available through the server 20 (such as a clip art database), or may be uploaded by the user to the server 20 through the user interface.

Further in embodiments in which a user has a personal calendar (stored for example in a calendar program 17, or on the server 20), a graphical indicator representing a conflict may be associated with a graphical indicator 15b, when the associated event conflicts with an event currently on the user's calendar. In this way a user can easily identify events that conflict with the user's schedule.

Also, in some embodiments map 15e may contain other map controls that perform other functions. For example, FIG. 7 illustrates a map control 15z that may be used to receive a time-based filter specifying information to appear on map 15e. Control 15z, for example, may receive as an input a value specifying a time or date range of events to appear on map 15e.

Figure 8:
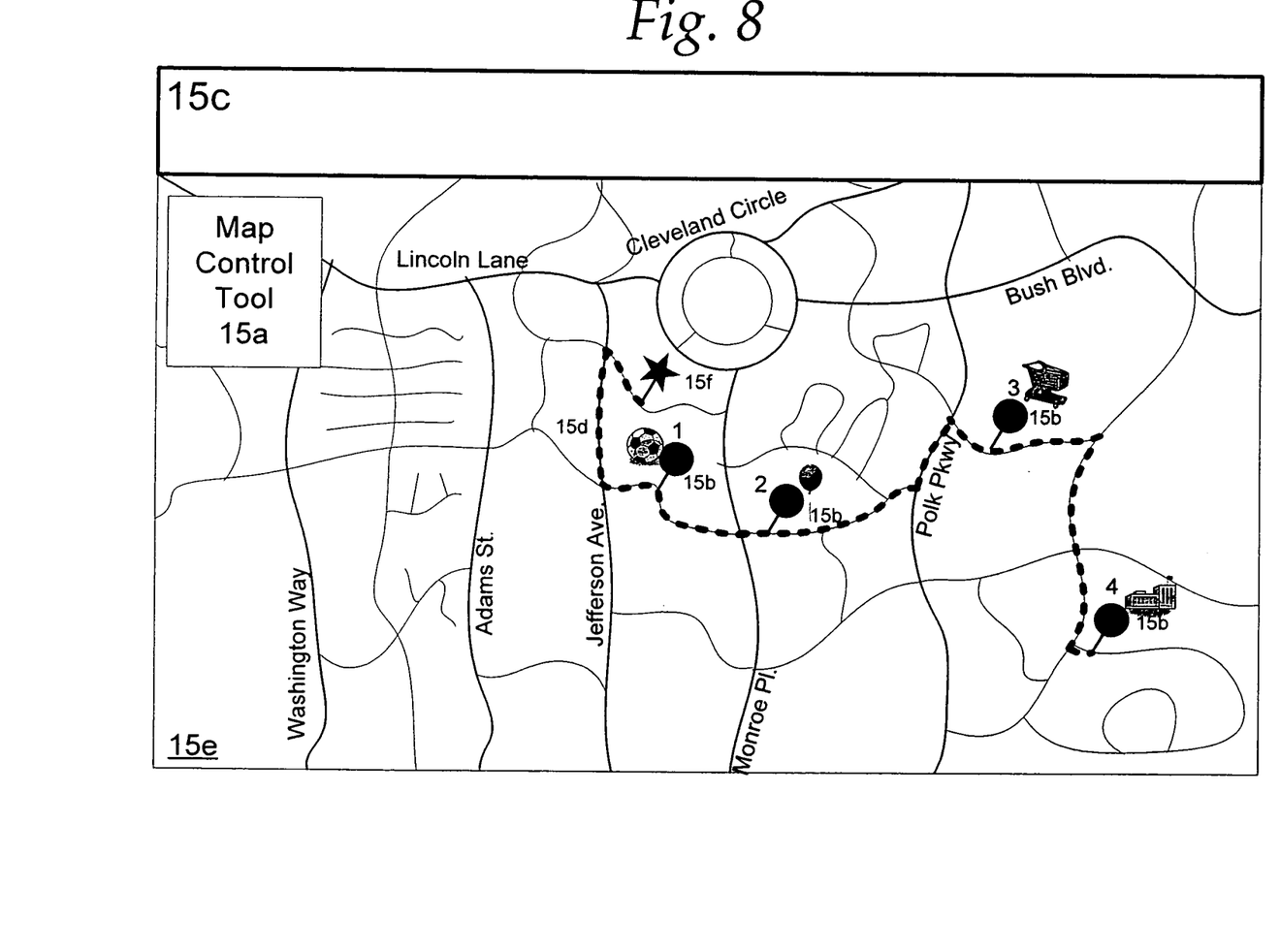
FIG. 8 is an illustration of a user interface displayed on the client device of FIG. 2 after a route has been calculated between a users location and four consecutive social events.

FIG. 8 shows examples of other types of information that may be displayed. In some embodiments, the time of the social events to be attended may be indicated by a plurality of colors. In this example the type of event is indicated by an icon near the location of the event. Event 1 is a soccer game, which is indicated by a soccer ball. Event 2 is a party, which is indicated by a balloon. Event 3 is grocery shopping, which is indicated by a shopping cart. Event 4 is picking up children from school, which is indicated by a school.

In FIG. 8, a user has specified a plurality of social events to be attended. In FIG. 8, these social events are labeled 1, 2, 3, and 4, and are scheduled in the listed order. The ordering of events may be determined in any suitable way. For example, events may have times associated with them and the events may be ordered based on the associated times. However, in some embodiments, events may be ordered expressly by user input or in any suitable fashion.

The user requests through a user interface that a route be determined between the events. The route may be determined based on the scheduled order of the events. The route may be determined in any suitable way and may, for example, be determined either locally on the client device 10, remotely on the server 20 or remotely by the mapping service 34. Regardless of how route information is obtained, it may be displayed as a superimposed route on the map 15d. In this example, the route begins at the user location 15f, proceeds to event 1, continues to event 2, then to event 3, and finally to event 4. In some embodiments a route returning the user to the user location 15f, may also be determined.

In some embodiments, suggested departure times, estimated travel times, written/pictorial directions may also be generated when determining a route for the user. In some embodiments a conflict is identified when events overlap or insufficient time exists to travel between events. In some embodiments events may or may not have a specific time or specific order associated with them. In these embodiments, a route may be calculated enabling the user to efficiently attend social events that begin at a specific time, and those that do not.

In a social event service, the user may acts as both a content consumer and content creator. As a content creator, the user, wishing to share information about a social event, may define information about a social event, which is uploaded to server 20 and stored in the event database 24. The user may specify through tools available through web browser 12 (FIG. 1) details of the event. Details about the social event may include the event name, geographic location, date and time, guest list, event description, what to bring, cost, etc. The user may also specify an icon to be associated with the event to provide a graphical indicator to the user. Upon uploading the created social event to the server 20, the server may return a confirmation comprising a graphical indication of the social event superimposed on a map. The graphical indication showing the location of the event and characteristics specified by the user such as a representative icon.

Figure 9:
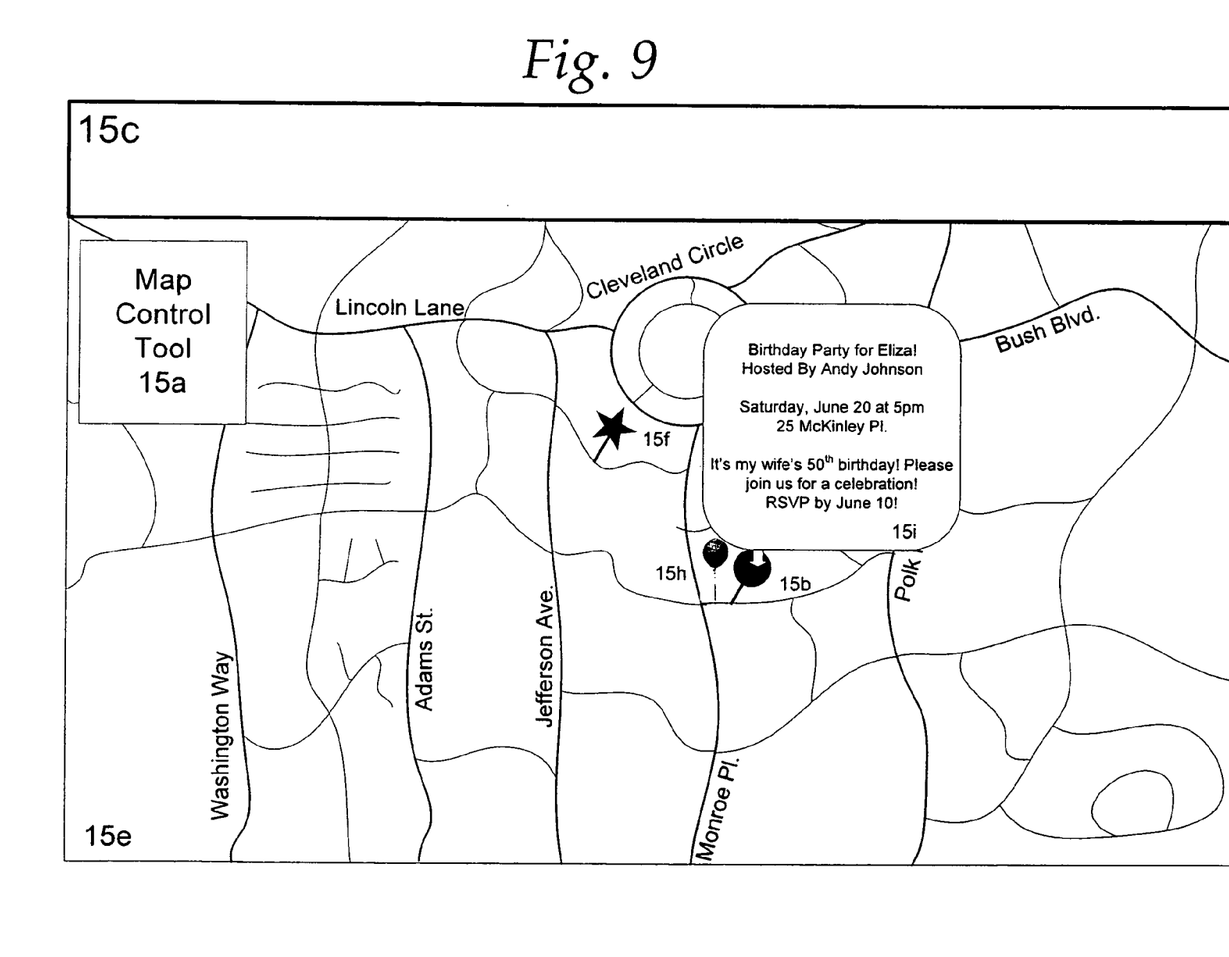
FIG. 9 is an illustration of a user interface displayed on the client device of FIG. 2 showing an invitation in its geographic context on a map.

A social networking service may provide functions to users other than storing and retrieving information about social events. For example, a social event service may facilitate organizing interactions among users who are members of a social network. As an example, a user among a plurality of users of a social event service may send an invitation for a social event to users among the plurality of users. The invitation is then distributed by the server 20 to users invited to the social event. Users invited to the social event may receive the invitation via email, upon logging into the server 20, via text message, or any other appropriate method. The user may then use the browser software 12 on his or her client device 10 to obtain and view information about the social event invitation 15i in its geographic context, as shown in FIG. 9. In this example, an icon 15h is displayed near the graphical indicator 15b of the location of the social event, representing the type of social event. In the example illustrated in FIG. 9, the social event to which an invitation has been issued is a party. Invitations may be issued to other types of social gatherings and may be presented to a user regardless of the type of event, the event, and the fact that the user is invited to the event in contrast to the user being scheduled to attend the event, may be indicated graphically on a map-centric display or in any other suitable format.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other computer storage media) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:
    receiving, by a computing device from a user, at least one desired characteristic of a social event, wherein the user is a member of one or more social networks;
    sending, by the computing device to a server, a search request based on the at least one desired characteristic, wherein the server facilitates organizing social events among members of the one or more social networks and manages the distribution of invitations to the social events among the members of the one or more social networks;
    receiving, by the computing device from the server, data relating to a plurality of social events to which the user has been invited by other members of the one or more social networks, the data comprising an event location, an event time, and an event description for each of the plurality of social events, wherein at least one characteristic of each of the plurality of social events matches the at least one desired characteristic received from the user;
    rendering, by the computing device on a display, a graphical map overlaid with a graphical indication of each event location of each of the plurality of social events to which the user has been invited;

receiving, at the graphical map rendered on the display, user input selecting one or more social events that the user intends to attend;

adding, by the computing device, the one or more social events that the user intends to attend to a calendar of the user; and rendering, by the computing device within the graphical map, a graphical indication of one or more routes between a location of the user and each of the event locations of the one or more social events that the user intends to attend.

2. The method of claim 1, wherein the at least one desired characteristic received from the user comprises a user specified date range.

3. The method of claim 1, further comprising:
presenting, by the computing device on the display, a listing of the one or more social events that the user intends to attend in chronological order according to the event time of each of the one or more social events that the user intends to attend.

4. The method of claim 1, further comprising:
rendering, by the computing device within the graphical map, a graphical indication of a suggested departure time for a social event that the user intends to attend.

5. The method of claim 1, wherein the at least one desired characteristic received from the user comprises a type of social event.

6. The method of claim 1, further comprising:
identifying, by the computing device, a conflict between two or more of the social events that the user intends to attend.

7. The method of claim 1, further comprising:
estimating, by the computing device, travel times between the location of the user and each of the event locations of the one or more social events that the user intends to attend; and
rendering, by the computing device within the graphical map, a graphical indication of an estimated travel time to a social event that the user intends to attend.

8. The method of claim 1, further comprising:
identifying, by the computing device, a conflict between one or more of the social events that the user intends to attend and a calendar event stored in the calendar of the user.

9. The method of claim 1, further comprising:
rendering, by the computing device within the graphical map, a graphical indication of an event description of a social event that the user intends to attend.

10. The method of claim 1, further comprising:
rendering, by the computing device within the graphical map, at least one icon representing a type of social event.

11. A computer-readable storage device storing computer-executable instructions that, when executed by a processor of a computing device, cause the computing device to perform a method comprising:
receiving, by the computing device from a user, at least one desired characteristic of a social event, wherein the user is a member of one or more social networks;
sending, by the computing device to a server, a search request based on the at least one desired characteristic, wherein the server facilitates organizing social events among members of the one or more social networks and manages the distribution of invitations to the social events among the members of the one or more social networks;

receiving, by the computing device from the server, data relating to a plurality of social events to which the user has been invited by other members of the one or more social networks, the data comprising an event location, an event time, and an event description for each of the plurality of social events, wherein at least one characteristic of each of the plurality of social events matches the at least one desired characteristic received from the user;

rendering, by the computing device on a display, a graphical map overlaid with a graphical indication of each event location of each of the plurality of social events to which the user has been invited;

receiving, at the graphical map rendered on the display, user input selecting one or more social events that the user intends to attend;

adding, by the computing device, the one or more social events that the user intends to attend to a calendar of the user; and rendering, by the computing device within the graphical map, a graphical indication of one or more routes between a location of the user and each of the event locations of the one or more social events that the user intends to attend.

12. The computer-readable storage device of claim 11, wherein the at least one desired characteristic received from the user comprises one or more of a user specified date range and a type of social event.

13. The computer-readable storage device of claim 11, the method further comprising:
rendering, by the computing device within the graphical map, a graphical indication of a suggested departure time for a social event that the user intends to attend.

14. The computer-readable storage device of claim 11, the method further comprising:
estimating, by the computing device, travel times between the location of the user and each of the event locations of the one or more social events that the user intends to attend; and
rendering, by the computing device within the graphical map, a graphical indication of an estimated travel time to a social event that the user intends to attend.

15. The computer-readable storage device of claim 11, the method further comprising:
rendering, by the computing device within the graphical map, a graphical indication of an event description of a social event that the user intends to attend.

16. A computing device comprising:
a processor configured to execute computer-executable instructions; and
memory storing computer-executable instructions for:
receiving, by the computing device from a user, at least one desired characteristic of a social event, wherein the user is a member of one or more social networks;
sending, by the computing device to a server, a search request based on the at least one desired characteristic, wherein the server facilitates organizing social events among members of the one or more social networks and manages the distribution of invitations to the social events among the members of the one or more social networks;
receiving, by the computing device from the server, data relating to a plurality of social events to which the user has been invited by other members of the one or more social networks, the data comprising an event location, an event time, and an event description for each of the plurality of social events, wherein at least one characteristic of each of the plurality of social events matches the at least one desired characteristic received from the user;

rendering, by the computing device on a display, a graphical map overlaid with a graphical indication of each event location of each of the plurality of social events to which the user has been invited;

receiving, at the graphical map rendered on the display, user input selecting one or more social events that the user intends to attend;

adding, by the computing device, the one or more social events that the user intends to attend to a calendar of the user; and rendering, by the computing device within the graphical map, a graphical indication of one or more routes between a location of the user and each of the event locations of the one or more social events that the user intends to attend.

17. The computing device of claim 16, wherein the at least one desired characteristic received from the user comprises one or more of a user specified date range and a type of social event.

18. The computing device of claim 16, further storing computer-executable instructions for:

rendering, by the computing device within the graphical map, a graphical indication of a suggested departure time for a social event that the user intends to attend.

19. The computing device of claim 16, further storing computer-executable instructions for:

estimating, by the computing device, travel times between the location of the user and each of the event locations of the one or more social events that the user intends to attend; and rendering, by the computing device within the graphical map, a graphical indication of an estimated travel time to a social event that the user intends to attend.

20. The computing device of claim 16, further storing computer-executable instructions for:

rendering, by the computing device within the graphical map, a graphical indication of an event description of a social event that the user intends to attend.

\* \* \* \* \*